(12) United States Patent
Wang (10) Patent No.: US 7,126,984 B2
(45) Date of Patent: *Oct. 24, 2006

(54) NEAR-END CROSSTALK NOISE MINIMIZATION AND POWER REDUCTION FOR DIGITAL SUBSCRIBER LOOPS

(75) Inventor: Xianbin Wang, Nepean (CA)

(73) Assignee: STMicroelectronics, Inc., Carrollton, TX (US)

(*) Notice: Subject to any disclaimer, the term of this patent is extended or adjusted under 35 U.S.C. 154(b) by 763 days.

This patent is subject to a terminal disclaimer.

(21) Appl. No.: 10/029,190

(22) Filed: Dec. 19, 2001

(65) Prior Publication Data

US 2003/0112858 A1 Jun. 19, 2003

(51) Int. Cl.
H04B 1/38 (2006.01)

(52) U.S. Cl. .............. 375/222; 375/219; 375/260; 370/252; 370/395.41; 370/463; 710/35; 379/22.04

(58) Field of Classification Search ............... 375/222, 375/219, 260; 370/252, 395.41, 463; 710/35; 379/22.04

See application file for complete search history.

(56) References Cited

U.S. PATENT DOCUMENTS

| | | | | |
|---|---|---|---|---|
| 5,838,681 | A * | 11/1998 | Bonomi et al. | 370/395.41 |
| 6,028,867 | A * | 2/2000 | Rawson et al. | 370/463 |
| 6,351,487 | B1 | 2/2002 | Lu et al. | |
| 6,754,186 | B1 | 6/2004 | Bullman | |
| 6,778,517 | B1 | 8/2004 | Lou et al. | |
| 6,801,964 | B1 * | 10/2004 | Mahdavi | 710/35 |
| 6,845,125 | B1 * | 1/2005 | Sasaki et al. | 375/219 |
| 6,853,647 | B1 * | 2/2005 | Rawson et al. | 370/463 |
| 2001/0055332 | A1 | 12/2001 | Sadjadpour et al. | |
| 2002/0032004 | A1 | 3/2002 | Widrow | |
| 2002/0041656 | A1 | 4/2002 | Shimura et al. | |
| 2002/0168016 | A1 * | 11/2002 | Wang et al. | 375/260 |
| 2002/0176368 | A1 | 11/2002 | Reddy | |
| 2003/0043894 | A1 * | 3/2003 | Sestok et al. | 375/219 |
| 2003/0108095 | A1 | 6/2003 | Duvaut et al. | |
| 2003/0117963 | A1 * | 6/2003 | Wang | 370/252 |

FOREIGN PATENT DOCUMENTS

| WO | WO 00/52894 | 9/2000 |
|---|---|---|
| WO | WO 01/61956 | 8/2001 |

OTHER PUBLICATIONS

American National Standard for Telecommunications, "Spectrum Management for Loop Transmission Systems", T1.417-2001, pp. 51-52, date unknown.
International Telecommunication Union, Transmission Systems and Media, Proposed Draft ITU-T Recommendation G.992.1 for "Asymmetrical Digital Subscriber Line (ADSL) Transceivers", pp. 56, 140, 150, date unknown.
International Telecommunication Union, Transmission Systems and Media, ITU-T Draft Recommendation G.992.2 for "Splitterless Asymmetric Digital Subscriber Line (ADSL) Transceivers", dated Feb. 17, 1999.
European Search Report, 02238608.5, dated Nov. 18, 2004.

* cited by examiner

Primary Examiner—Emmanuel Bayard
Assistant Examiner—Sudhanshu C. Pathak
(74) Attorney, Agent, or Firm—Lisa K. Jorgenson; Andre M. Szuwalski (57) ABSTRACT

To optimize the performance of DSL modems in the same cable bundle, the size and position of the bandwidth used for transmission is intelligently selected when the bit rate necessary for making the transmission is less than the total available bandwidth. By intelligently selecting a minimum number of subcarriers for Digital Multi-tone (DMT) signal transmission, a reduction in line driver power consumption is effectuated. Additionally, by intelligently selecting the position of the used bandwidth within the total available bandwidth, near-end crosstalk (NEXT) noise within the cable bundle may be minimized.

32 Claims, 6 Drawing Sheets

NEAR-END CROSSTALK NOISE MINIMIZATION AND POWER REDUCTION FOR DIGITAL SUBSCRIBER LOOPS

CROSS-REFERENCE TO RELATED APPLICATION

The present application is related to commonly-assigned, co-pending, application for patent Ser. No. 10/028,805 entitled "METHOD AND APPARATUS FOR APPLICATION DRIVEN ADAPTIVE DUPLEXING OF DIGITAL SUBSCRIBER LOOPS" filed concurrently herewith on Dec. 19. 2001, the disclosure of which is hereby incorporated by reference.

BACKGROUND OF THE INVENTION

1. Technical Field of the Invention

The present invention relates to digital subscriber loop (DSL) systems and, more particularly, to a method and apparatus for minimizing near-end crosstalk (NEXT) noise and reducing power consumption within a DSL system modem, transmitter and line driver.

2. Description of Related Art

Crosstalk is noise that is present on a phone line due to the electromagnetic radiation of other, closely proximate, phone lines (for example, lines located in the same cable bundle). The term "crosstalk" was originally coined to indicate the presence in a telephone receiver of unwanted speech sounds from another telephone conversation. The term has been gradually broadened in application to refer to interference between any kind of communications circuits. This kind of noise includes both near-end crosstalk (NEXT) and far-end crosstalk (FEXT) components.

With respect to digital subscriber loop (DSL) systems, it is generally accepted that the NEXT noise, as opposed to FEXT noise, presents the major source of interference. The reason for this is that FEXT noise passes through the entire DSL loop and thus its propagation loss generally is very large and in many cases the noise can simply be ignored. The opposite is true with respect to NEXT noise which undergoes little, relatively speaking, attenuation in its short propagation path. The concerns over NEXT noise remain even when the bit rate of the transmitted signal is small because idle ATM cells are inserted to fill up all the data frames of the DSL link (both upstream and downstream), and the transmission of this filler material is also a source of noise.

When DSL services are offered on different loops in the same cable bundle, it is very important to reduce and minimize NEXT noise contributed by a DSL communication on one loop with respect to the communications on other loops within the bundle. Doing so beneficially improves DSL system error rate performance and increases loop throughput.

Power consumption is also a very important factor to be managed in DSL systems. This is most commonly an issue raised with respect to the design of the DSL modem, and it applies to both the customer premises equipment (CPE) location and the central office (CO) location. A number of power concerns are recognized in the art. For example, the more power that is transmitted in a DSL system, the more likely it is that crosstalk noise will be coupled to other DSL users in the same cable bundle. It is also recognized that if a universal serial bus (USB) interface is used for an external modem at the CPE side, the power consumption of the modem is limited by the USB standard. With respect to the CO location, many DSL line cards are installed in a very limited space, and heat dissipation is a serious concern. Any reduction in power consumption in the DSL modem is therefore welcomed. Still further, power consumption is also important for laptop computers having limited capacity batteries. Finally, the use of additional bandwidth by the filler material ATM idle cells (which may lead to NEXT noise as discussed above) increases the power consumption for both of the line drivers at the CO and CPE locations without providing a substantive communications benefit.

SUMMARY OF THE INVENTION

The present invention concerns a method and apparatus associated with a digital subscriber line (DSL) transmitter that optimizes communications performance over a cable bundle carrying at least one active DSL loop communication. In response to a new DSL loop communication, a required bit rate for that communication is determined. That required bit rate corresponds with a required bandwidth for the new DSL communication that is generally smaller than a total available bandwidth on the loop. A calculation is then made of a crosstalk noise effect caused by the new DSL loop communication with respect to the at least one active DSL loop communication. This calculation is made for each one of a plurality of potential positions for the required bandwidth within the total available bandwidth. The potential position having the best calculated crosstalk noise effect is then selected as the position of the required bandwidth for carrying the new DSL communication.

More specifically, and in accordance with an embodiment of the present invention, the required bandwidth corresponds to a certain number of DMT subcarriers, and it is those subcarriers that are used to transmit the new DSL communication. These subcarriers may vary in number with different potential positions of the required bandwidth within the total available bandwidth.

It is an embodiment of the present invention, with respect to the process used in choosing the position of the required bandwidth, for that process to be applicable to both upstream and downstream available bandwidths.

It is still further an embodiment of the present invention for the determination of the required bit rate of the new DSL loop communication to comprise that bit rate which is needed for data communication without the inclusion of unnecessary idle ATM cells.

By choosing a possible position for the required bandwidth within the total available bandwidth where the calculated crosstalk noise effect with respect to the at least one active DSL loop is minimized, an optimized performance for the DSL modem may be achieved. Furthermore, the use of a minimum number of DMT subcarriers in association with the required bandwidth effectuates a reduction in line driver power consumption as compared to the prior art.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 3:
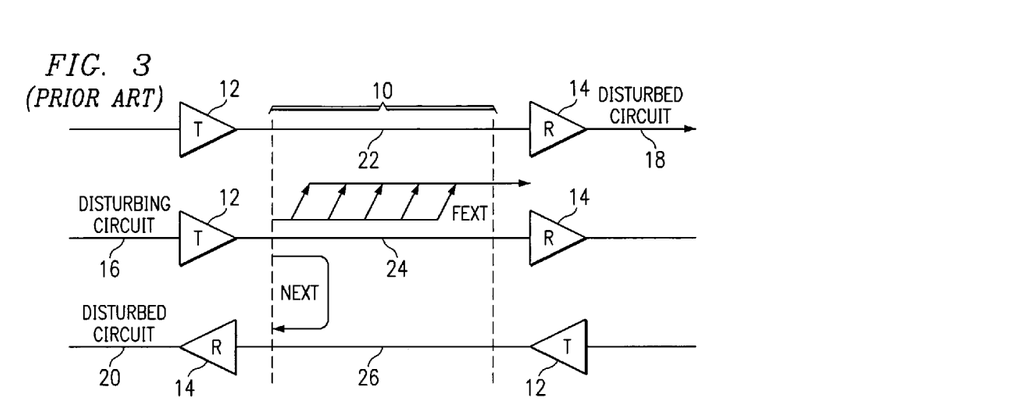
FIG. 3 is a diagram illustrating NEXT noise and FEXT noise sources in a cable bundle.

Reference is now made to FIG. 3 wherein there is shown a diagram illustrating near-end crosstalk (NEXT) noise and far-end crosstalk (FEXT) noise sources in a cable bundle 10. It is well known that the performance of a DSL modem is generally limited by the crosstalk noise introduced by other modems that are connected to the other loops in the same cable bundle 10. The crosstalk phenomenon can be modeled using two components, namely NEXT noise and the FEXT noise. A DSL line driver 12 is designated by a triangular "T" reference, while a DSL line receiver 14 is designated by a triangular "R" reference. A disturbing circuit 16 is shown as both a NEXT noise component source and a FEXT noise component source. NEXT noise occurs when the line receiver 14 of the disturbed circuit 20 is located at the same end of the cable bundle 10 as the line driver 12. The disturbed circuit 20 experiences NEXT noise due to electromagnetic radiation received on line (or loop) 26 from line/loop 24 in the cable bundle 10. FEXT noise occurs when the line receiver 14 of the disturbed circuit 18 is located at the other end of cable bundle 10 from the line driver 12. The disturbed circuit 18 experiences FEXT noise due to electromagnetic radiation received on line/loop 22 from line/loop 24. The NEXT noise component is generally of much greater magnitude and concern than the FEXT noise component.

In order to improve the performance of a DSL modem, one primary objective of a modem designer should be the minimization of the crosstalk noise in the cable bundle 10. This is especially true with respect to the NEXT noise component. For example, NEXT noise may be minimized in prior art G.Lite and G.DMT DSL system implementations by separating the upstream and downstream bandwidths. This prior art solution, however, is of limited utility as DSL modems and communications services become more complex, and a need exists for a technique of more universal and future applicability for reducing the NEXT noise component and combating power dissipation concerns.

In accordance with the present invention, an optimized crosstalk performance for a DSL system may be obtained by considering the following factors:

Minimization of the NEXT noise. The existence of overlapping upstream and/or downstream bandwidths for DSL communications by plural users on a common cable bundle is a primary cause of NEXT noise. It is further recognized, as discussed above, that not all of the available upstream/downstream bandwidth is needed and thus a smaller, necessary or required bandwidth may be allocated. Some control may be exercised over the placement of the required downstream bandwidth within the DSL spectrum. By selectively placing the required downstream bandwidth, the NEXT effect experienced by others on the same cable bundle as a result of a common or overlapping bandwidth between loops may be minimized, and significant reductions in NEXT noise may be achieved.

Minimization of allocated bandwidth. DSL operation dictates the insertion of idle ATM cells to fill all data frames when the bit rate of the data to be transmitted is smaller than the available throughput rate of the DSL link (both upstream and downstream) that is defined by the allocated number of subcarriers. For example, when the DSL user is browsing a website, the upstream data rate can be as low as few kilobits per second, with the remainder of the available throughput rate is met by the transmission of idle ATM cells that add substantively nothing to the data transmission but nonetheless contribute significantly to crosstalk noise as well as power consumption. In some extreme situations, for example, when there is no data to be transmitted, idle ATM cells are transmitted to fill the available throughput rate and accordingly comprise the only source of crosstalk noise. By intelligently selecting the minimum number of the subcarriers used for the Digital Multi-tone (DMT) signals (i.e., minimizing the utilized bandwidth) according to the bit rates of the data streams in the upstream and downstream directions, the size of the DSL link bandwidth used for communication is better tailored to the data being transmitted and crosstalk noise to other users, especially NEXT noise, can be significantly reduced. As an added benefit, by controlling the usage of the upstream and downstream bandwidth in terms of the minimum number of allocated and utilized DMT subcarriers, the power consumption of the line driver is substantially reduced.

Figures 4, 10:
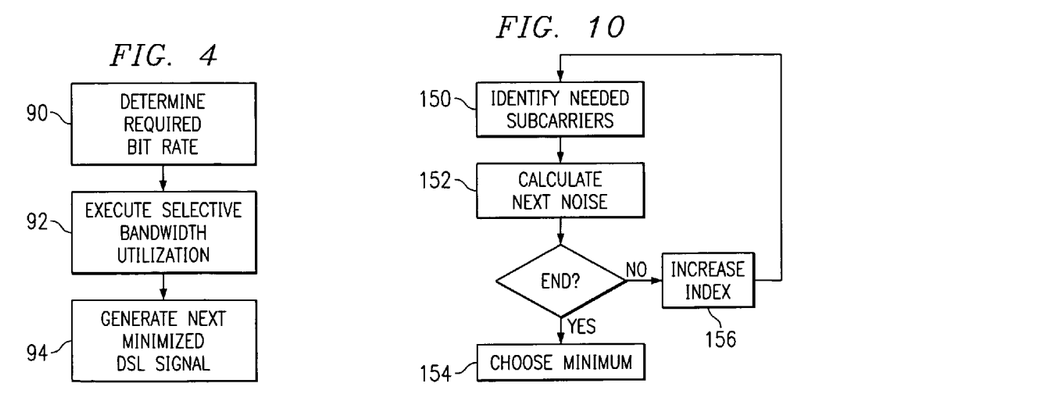
FIG. 4 is flow diagram illustrating a process for NEXT noise minimization when establishing a new DSL link.
FIG. 10 is a flow diagram for a process to minimize NEXT noise for the new initialized loop in the same cable bundle.

Attention is now directed to FIG. 4 which is a flow diagram illustrating a process for NEXT noise minimization when establishing a new DSL loop communication. In step 90, the required bit rate for the data communication (upstream and/or downstream) over the new DSL loop communication is determined. More specifically, the data communication is examined to identify and remove idle ATM cells. What is left over substantially represents the bit rate requirements for transmission of the data communication itself.

Figure 5:
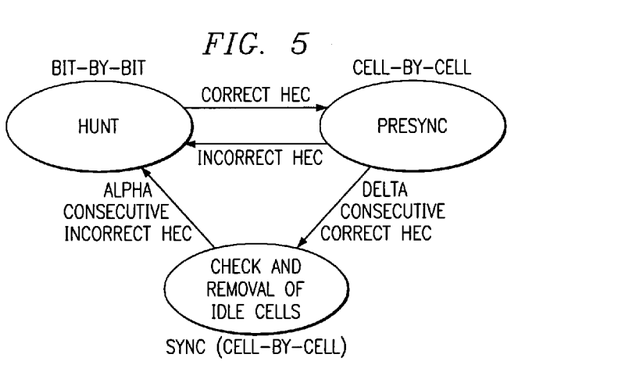
FIG. 5 is a state machine diagram operating an idle ATM cell removal process.

An idle ATM cell removal process performed in connection with step 90 permits the identification ATM cell boundaries in the payload of the data communication. The cells within the boundaries may then be discarded. Reference is now made to FIG. 5 wherein there is shown a state machine diagram operating the idle ATM cell removal process. The details of the state diagram are described below.

In the HUNT state, the ATM delineation process is performed by checking bit-by-bit for the correct header error control (HEC) field in the cell header. Once it is found, an assumption is made that one header has been found, and the method enters the PRESYNC state. It should be recognized that when byte boundaries are available, the cell delineation process may be performed on a byte-by-byte basis instead.

In the PRESYNC state, the delineation process is performed by checking cell-by-cell for the correct HEC field. The process repeats until the correct HEC field has been confirmed a certain number (designated DELTA) of times consecutively. As an example, ITU-T I.432 suggests that the DELTA number be 6. The process then moves to the SYNC state. If an incorrect HEC field is found, the process returns to the HUNT state.

In the SYNC state, idle cells will be discarded by checking the header of each cell. The process for performing this discarding operation is shown in the flow diagram of FIG. 6. The cell delineation will be assumed to be lost if an incorrect HEC field is obtained a certain number (designated ALPHA) of times consecutively. As an example, ITU-T 1.432 suggests that the ALPHA number be 7. If an incorrect HEC field is found, the process returns to the HUNT state.

Figure 6:
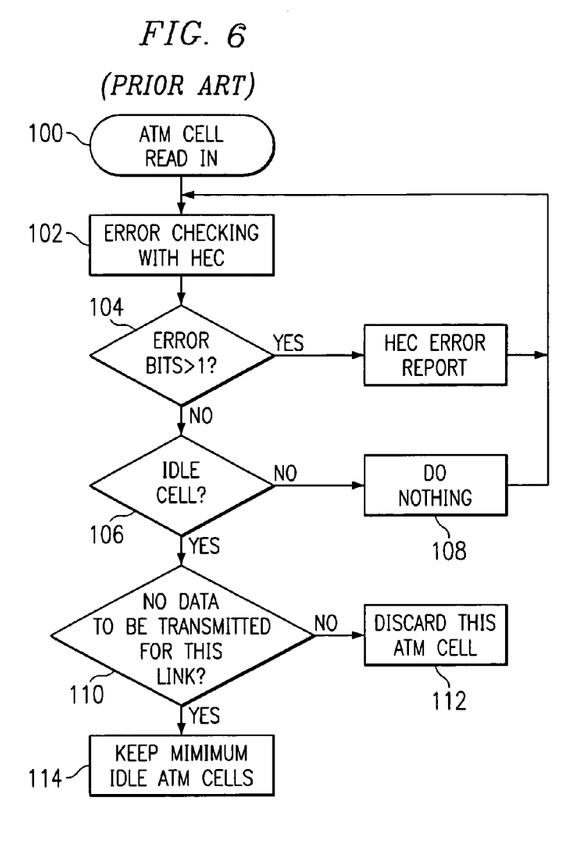
FIG. 6 is flow diagram illustrating a process for performing an idle cell discarding operation.

The idle cell discarding operation of FIG. 6 that is performed in the SYNC state first reads an ATM cell in (step 100). Next, in step 102, the read-in cell is error checked using the HEC field. If the number of error bits exceeds one, as determined in step 104, the process performed by the idle cell removal machine will report the HEC error and return to step 102. Otherwise, the process moves on to check in step 106 for an idle ATM cell by, for example, determining whether the virtual path identifier (VPI) virtual channel identifier (VCI) and payload type (PLT) information bits in the header are all zero, and also if the cell loss priority (CLP) is one. If not all of these conditions are met, nothing is to be done with the read-in cell (step 108) and the process returns to step 102. The reason for this is that the process for idle cell removal is designed to only remove the redundant idle cells in the ATM data stream. Original data must remain unchanged. If the ATM cell under examination is not an idle cell (i.e., the cell is a data cell), the cell is passed on to the next transmitter processing stage. If there is a match in step 106, the process moves to step 110 where a determination is made as to whether no data exists to be transmitted on the link. If the determination is no (i.e., that there is data to be transmitted), then the ATM cell can be discarded in step 112. Otherwise, the ATM cell is kept in step 114 as a minimum required ATM cell for the link (for example, for DSL synchronization purposes) Following steps 112 or 114, the process returns to step 100 to read in a next ATM cell.

Reference is now once again made to FIG. 4. The step 90 determined bit rates for the upstream and downstream will generally be much smaller than the corresponding maximum available throughput rates of the DSL loop. This allows for some flexibility to be exercised in selectively using different parts of the available upstream and downstream bandwidth to minimize instances of overlapping bandwidth within the same cable bundle that contributes to NEXT noise and further reduce the power consumption of the DSL modem. The operation for selective bandwidth utilization is performed in step 92.

Figure 7:
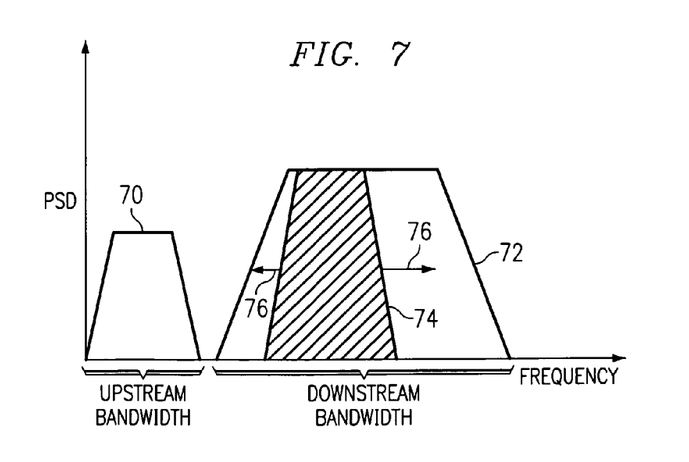
FIG. 7 illustrates selective bandwidth utilization for DSL service.

The concept of selective bandwidth utilization (step 92) is illustrated in an exemplary fashion in FIG. 7 for a CPE DSL receiver. Trapezoid 70 represents the total available upstream bandwidth. Trapezoid 72 represents the total available downstream bandwidth. Shaded trapezoid 74 represents the required downstream bandwidth needed to support transmission of the step 90 determined downstream bit rate for a DSL communication. It is recognized that the required downstream bandwidth 74 is smaller than the total available downstream bandwidth 72. Because of this, a selective position placement of the required downstream bandwidth 74 within the total available downstream bandwidth 72 may be made in step 92. This selective placement is effectuated by sliding (as indicated by the arrows 76) the required downstream bandwidth 74 in position along the frequency axis until a suitable location is identified. The determination of what is suitable is made in accordance with the present invention by evaluating crosstalk noise at each potential required downstream bandwidth 74 location within the total available downstream bandwidth 72. The location chosen for the positioning and placement of the required downstream bandwidth 74 within the total available downstream bandwidth 72 is that location where crosstalk noise due to overlapping bandwidth is minimized.

Figure 8:
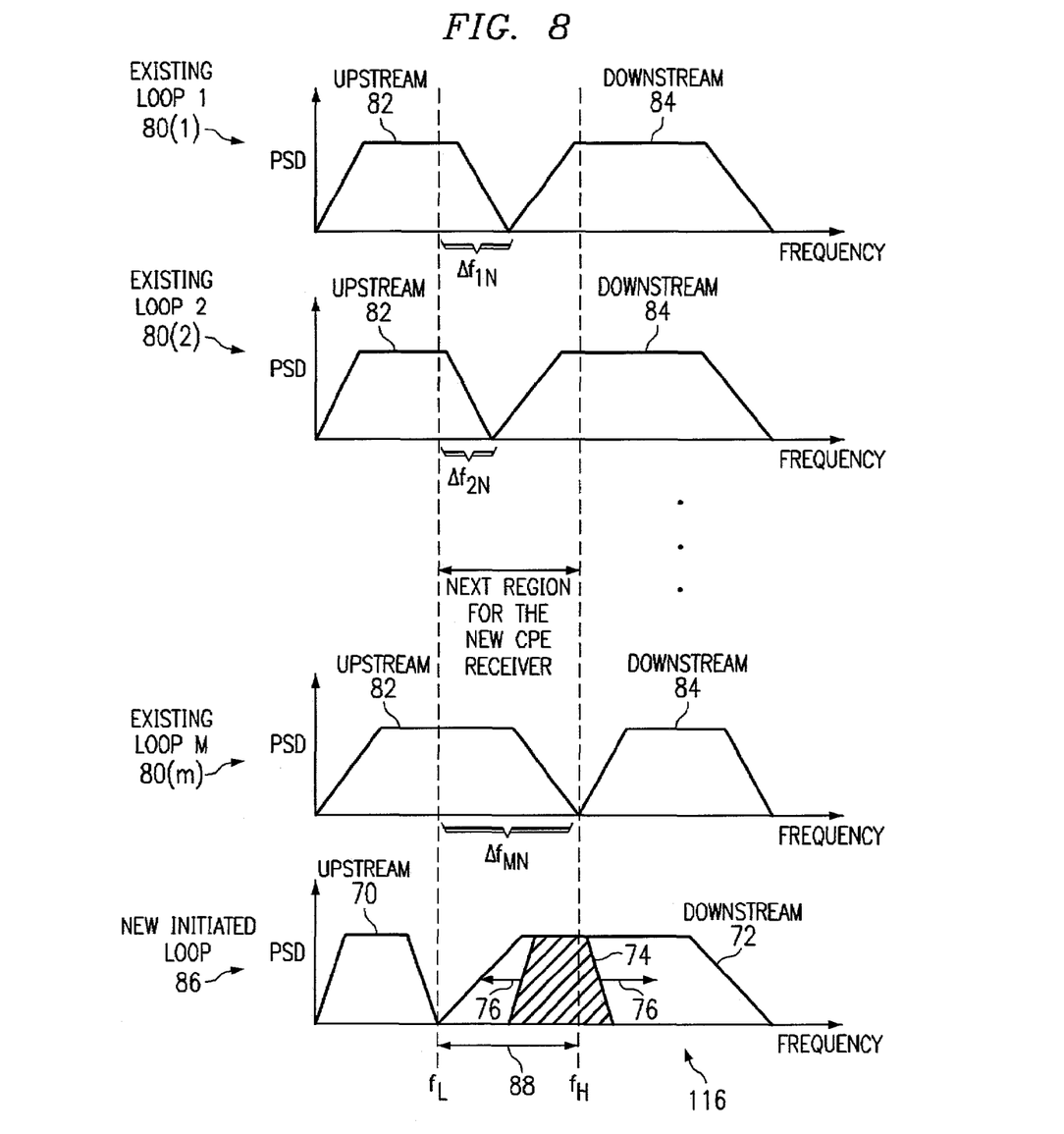
FIG. 8 illustrates selective bandwidth utilization to minimize NEXT noise in a non-overlapped DSL system implementation.
Figure 9:
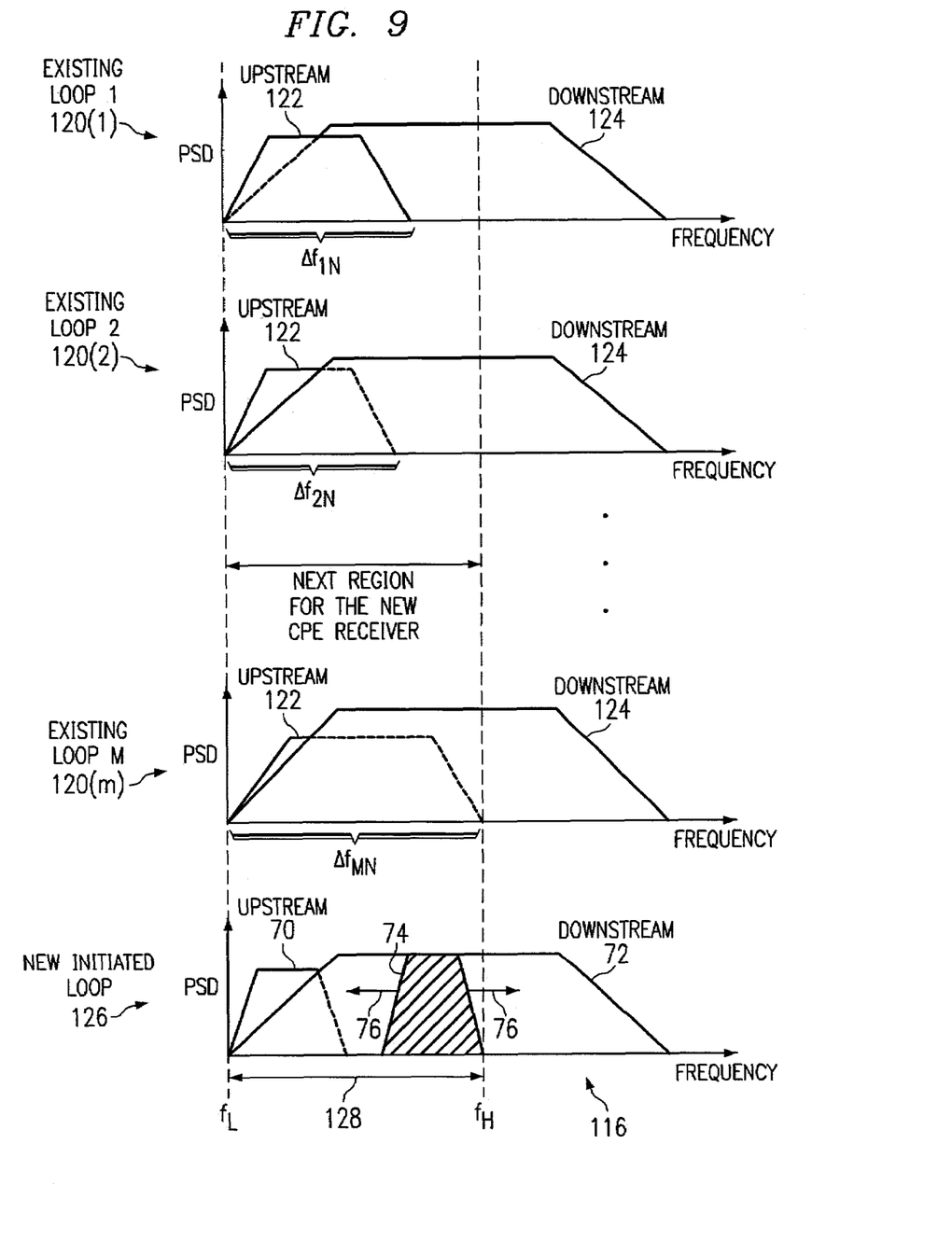
FIG. 9 illustrates selective bandwidth utilization to minimize NEXT noise in an overlapped DSL system implementation.

It is to be noted here that the meaning of "overlapping bandwidth" in the context of the present invention is the bandwidth that is responsible for the existence of crosstalk noise (primarily, NEXT noise) in a cable bundle. This is graphically illustrated in FIGS. 8 and 9 for two different modes of DSL operation. In FIG. 8, selective bandwidth utilization to minimize NEXT noise is illustrated in a non-overlapped DSL system implementation. A non-overlapped DSL system is one where the upstream and downstream bandwidths are separated from each other in the frequency band. In FIG. 9, selective bandwidth utilization to minimize NEXT noise is illustrated in an overlapped DSL system implementation. An overlapped DSL system is one where the upstream and downstream bandwidths are not separated from each other (i.e., they wholly or partially overlap) in the frequency band.

Turning first to FIG. 8, it is noted that on a given cable bundle, M non-overlapped loop communications 80(1)-80(M) already exist. These communications 80 are established and are each using a designated upstream bandwidth 82 and a designated downstream bandwidth 84 on their respective individual loops. Notably, these bandwidths may, and likely will be, of different sizes and positions within the frequency band. At this point, a new loop communication 86 is to be initiated. This loop communication 86, as discussed above in connection with FIG. 7, has a total available upstream bandwidth 70, a total available downstream bandwidth 72, and a required downstream bandwidth 74 that is needed to support transmission of the FIG. 4, step 90, determined downstream bit rate.

With respect to the DSL receiver for the new loop communication 86, the group of loop communications 80(1)-80(M) and 86 have a NEXT noise overlapping bandwidth 88 extending in the frequency band from $f_L$ to $f_H$ for downstream communications within the cable bundle. The frequency $f_L$ at the low end of the NEXT noise overlapping bandwidth 88 is the lowest frequency for any of the downstream bandwidths 72 or 84 in same cable bundle. The frequency $f_H$ at the high end of the NEXT noise overlapping bandwidth 88 is the highest frequency for any of the upstream bandwidths 70 or 82 in same cable bundle. Noting again that the total available downstream bandwidth 72 is wider than the required downstream bandwidth 74, there exist several (if not many) possible locations where the required downstream bandwidth can be placed within the total available downstream bandwidth. It is further recognized that the NEXT noise contributed to the cable bundle by the addition of the new loop communication 86 and its required downstream bandwidth 74 varies as a function of position within the total available downstream bandwidth 72. Theoretically speaking, a best location for the required downstream bandwidth 74 would be completely outside the NEXT noise overlapping bandwidth 88 (for example, in the region designated at reference 116). In most situations, however, due to the relative sizes of the required downstream bandwidth 74 and the total available downstream bandwidth 72, as well as the sizes and positions of the bandwidths 82 and 84, this may not be achievable. However, by sliding the position of the required downstream bandwidth 74 within the total available downstream bandwidth 72 and through the NEXT noise overlapping bandwidth 88 as indicated by the arrows 76, and further noting the NEXT noise contributed to the cable bundle at each possible location, an optimal position having minimized NEXT noise effect may be selected for the required downstream bandwidth 74.

Turning next to FIG. 9, it is noted that on a given cable bundle, M overlapped loop communications 120(1)-120(M) already exist. These communications 120 are established and are each using a designated upstream bandwidth 122 and a designated downstream bandwidth 124. Notably, these bandwidths may, and likely will be, of different sizes, and further overlap each other in whole or in part within the frequency band. At this point, a new loop communication 126 is to be initiated. This loop communication 126, as discussed above in connection with FIG. 7, has a total available upstream bandwidth 70, a total available downstream bandwidth 72, and a required downstream bandwidth 74 that is needed to support transmission of the FIG. 4, step 90, determined downstream bit rate. Note, in this scenario, that the total available upstream bandwidth 70 and the total available downstream bandwidth 72 may overlap each other in whole or in part within the frequency band.

With respect to the DSL receiver for the new loop communication 126, the group of loop communications 120(1)-120(M) and 126 have a NEXT noise overlapping bandwidth 128 extending in the frequency band from $f_L$ to $f_H$ for downstream communications within the cable bundle. The frequency $f_L$ at the low end of the NEXT noise overlapping bandwidth 128 is the lowest frequency for any of the downstream bandwidths 72 or 124 in same cable bundle. The frequency $f_H$ at the high end of the NEXT noise overlapping bandwidth 128 is the highest frequency for any of the upstream bandwidths 70 or 122 in same cable bundle. Noting again that the total available downstream bandwidth 72 is wider than the required downstream bandwidth 74, there exist several (if not many) possible locations where the required downstream bandwidth can be placed within the total available downstream bandwidth. It is further recognized that the NEXT noise contributed to the cable bundle by the addition of the new loop communication 126 and its required downstream bandwidth 74 varies as a function of position within the total available downstream bandwidth 72. Theoretically speaking, a best location for the required downstream bandwidth 74 would be completely outside the NEXT noise overlapping bandwidth 128 (for example, in the region designated at reference 116). In most situations, however, due to the relative sizes of the required downstream bandwidth 74 and the total available downstream bandwidth 72, as well as the sizes and positions of the bandwidths 122 and 124, this may not be achievable. However, by sliding the position of the required downstream bandwidth 74 within the total available downstream bandwidth 72 and through the NEXT noise overlapping bandwidth 128 as indicated by the arrows 76, and further noting the NEXT noise contributed to the cable bundle at each possible location, an optimal position having minimized NEXT noise effect may be selected for the required downstream bandwidth 74.

Although FIGS. 7–9 illustrate operation of the selective bandwidth utilization process with respect to a DSL receiver and the downstream bandwidth, it will be understood by those skilled in the art that a similar operation may be implemented with respect to positioning a required upstream bandwidth within a total available upstream bandwidth as well. It should also be understood and recognized that the process is equally applicable to the DSL modem at either end of the cable bundle. The specific reference and illustration in FIGS. 7–9 to downstream bandwidth is exemplary in nature only.

In order to make the position determinations discussed above in connection with FIGS. 8 and 9, and execute the performance of the FIG. 4, step 92, selective bandwidth utilization process, the NEXT noise at each location, as the position of the required bandwidth (for example, reference 74) is slid within the total available bandwidth (for example, reference 72), must be computed. The computation of NEXT noise may be accomplished using either of the following two different methods:

First, the Analytical Method. The NEXT noise from n identical disturbing sources can be modeled with empirical coupling transfer functions of the following form:

$$PSD_{NEXT}(f_k) = PSD_{disturber}(f_k) \times X_N \times n^{0.6} \times f^{\frac{3}{2}} \quad (1)$$

wherein: $X_N = 8.536 \times 10^{-15}$;
n = number of disturbers;
$f_k$ is the frequency in Hz at k-th subcarrier; and
$PSD_{disturber}$ is the power spectrum of the interfering system.

See, T1.417, Spectrum Management for Loop Transmission Systems, American National Standard, Alliance for Telecommunications Industry Solutions (ATIS), January 2001. However, it is very common that different disturbers co-exist in the same cable. To combine the crosstalk contributions from different disturbers, the following expression is used to calculate the NEXT noise due to the combination of sources:

$$PSD_{NEXT\_TOTAL}(f_k) = \left( \sum_i^M (PSD_{i,disturber}(f_k, n_i))^{\frac{1}{0.6}} \right)^{0.6} \quad (2)$$

wherein: M is the number of the types of the disturbers; and
$n_i$ is the number of the disturbing sources for each type.

See, T1.417, Spectrum Management for Loop Transmission Systems, American National Standard, Alliance for Telecommunications Industry Solutions (ATIS), January 2001. For example, consider the case of two sources of NEXT at a given receiver. In this case there are $n_1$ disturber systems of spectrum $S_1(f)$ and $n_2$ disturber systems of spectrum $S_2(f)$. The combined NEXT is accordingly expressed as:

$$PSD_{NEXT\_TOTAL}(f_k) = \left( (S_1(f_k, n_1))^{\frac{1}{0.6}} + (S_2(f_k, n_2))^{\frac{1}{0.6}} \right)^{0.6} \quad (3)$$

See, T1.417, Spectrum Management for Loop Transmission Systems, American National Standard, Alliance for Telecommunications Industry Solutions (ATIS), January 2001.

Second, the Estimation Method. To compute the NEXT noise, an estimate can be made by evaluating the silent symbols during the initialization process. The corresponding equation for this action is as follows:

$$PSD_{NEXT\_TOTAL}(f_k) = \frac{1}{L\sqrt{2N}} \sum_{i=0}^{L-1} \sum_{n=0}^{2N-1} r_i(n) \cdot \exp\left( \frac{j\pi kn}{N} \right) \quad (4)$$

wherein: L is the total number of the silent DMT symbols for the NEXT noise estimation;
i is the index of the subcarriers for NEXT estimation;
N is the maximum number of subcarriers the IDFT modulator can support; and
the value $r_i(n)$ is the n-th received sample for the i-th DMT symbol.

It is to be noted here that this estimation result in fact is the combination of NEXT, FEXT and additive white Gaussian noise. However, as the NEXT noise is the major source of interference, the above estimation can be approximately regarded as the NEXT noise component.

Reference is now made to FIG. 10 wherein there is shown a flow diagram for a process to minimize NEXT noise for the new initialized DSL loop communication in the same cable bundle in connection with making the position determinations discussed above in connection with FIGS. 8 and 9, and the execution of the FIG. 4, step 92, selective bandwidth utilization process. A loop 156 is executed to make calculations at a plurality of position locations. For each pass through the loop 156, at step 150, the number of subcarriers needed to support the upstream data communication and downstream data communication is found. This step, in effect, calculates the number of subcarriers for each position index i as the required bandwidth (for example, reference 74) is slid across the total available bandwidth (for example, reference 72). This number representing the number of needed subcarriers is likely to be different at different positions (i.e., locations) of the required bandwidth due to the fact that different numbers of bits can be supported in DSL system at different subcarriers. In step 152, the total NEXT noise contributed by the required bandwidth at the current position location is determined. This step, in effect, calculates the NEXT noise contribution for each position index i as the required bandwidth (for example, reference 74) is slid across the total available bandwidth (for example, reference 72). This total NEXT noise calculation can be determined in accordance with the following:

$$P_{NEXT} = \sum_{k=k_1(i)}^{k_2(i)} PSD_{NEXT\_TOTAL}(f_k) \quad (5)$$

wherein: $k_1$ and $k_2$ are the beginning and ending points of the required bandwidth in terms of the subcarrier index.

It is to be noted here that $k_1$ and $k_2$ will depend on the position index i for the subcarriers. The number of subcarriers between $k_1(i)$ and $k_2(i)$ is fully dependent on the upstream/downstream bitmap for the DMT modulator. Finally, in step 154, minimization of the NEXT noise is made by choosing the position index i having the minimum value of $P_{NEXT}$. The corresponding $k_1(i)$ and $k_2(i)$ values represent the starting and ending subcarriers for the required bandwidth (within the total available bandwidth) at the determined position having minimum NEXT noise.

It should be noted here that NEXT noise minimization process has an added benefit in that the determined $k_1(i)$ and $k_2(i)$ values which represent the starting and ending subcarriers of the required bandwidth at the NEXT noise minimized position within the total available bandwidth further specify, for minimized NEXT noise, a minimum number of subcarriers that are necessary to carry the FIG. 4, step 90, determined required bit rate for the data communication on the new DSL loop. Minimization of the transmission bandwidth with a smaller number of DMT subcarriers leads to a reduction in the power consumption of the line driver. The DMT signal samples in real form after the IDFT modulation can be expressed as:

$$s(n) = \sqrt{\frac{2}{N}} \sum_{k=1}^{N-1} g_k \left\{ a_k \cos\left(\frac{\pi k n}{N}\right) + b_k \sin\left(\frac{\pi k n}{N}\right) \right\}, \quad (6)$$

wherein: $a_k - jb_k$ is the transmitted data for the k-th subcarrier;
N is the maximum number of the subcarriers the IDFT modulator can support;
2N is the fast Fourier transform size of the DMT system; and
$g_k$ is the transmission power control factor for the k-th subcarrier.

The average power of the DMT signal can be easily determined as follows:

$$P_s^2 = \frac{1}{N} \sum_{k=1}^{N-1} g_k^2 (a_k^2 + b_k^2), \quad (7)$$

However, if not all of subcarriers are used in the transmitter, the average power of the DMT signal becomes:

$$P_s^2 = \frac{1}{N} \sum_{k=k_1}^{k_2} g_k^2 (a_k^2 + b_k^2), \quad (8)$$

As the bit rates may vary significantly for different applications and the data rate across the network has bottlenecks, the operation disclosed above for selective bandwidth utilization will have a substantial effect on power consumption reduction. For example, if we assume the downstream bit rate is 500 Kb/s, which is typically not available as an Internet accessing speed for most residential users, the power consumption can be reduced by minimizing the number of subcarriers by approximately 91.66% ((6000−500)Kb/6000 Kb). Here, we assume a throughput for the DSL downstream of 6 Mb/s. For a downstream connection with a lower available accessing speed, this figure can still be higher.

Reference is now once again made to FIG. 4. Having determined the size and location of the required bandwidth within the total available bandwidth for the new DSL communication, the process generates of the NEXT minimized digital multi-tone (DMT) signal in step 94.

The maximum number of the available upstream (U) and downstream (D) subcarriers (S) that can be supported by a DSL modem is denoted as $N_{SU}$ and $N_{SD}$, respectively. It is noted that $N_{SU}$ and $N_{SD}$ might be different for various DSL standards. It is also noted that not all the available subcarriers are actually used in connection with the implementation of the present invention. The number of the subcarriers actually used for the upstream and downstream are accordingly denoted as $N_{upstream}$ and $N_{downstream}$. The $N_{upstream}$ and $N_{downstream}$ subcarriers are determined in the manner set forth above (using the process of step 92 and the determination of the position index i having the NEXT noise minimum value of $P_{NEXT}$ along with the corresponding $k_1(i)$ and $k_2(i)$ values representing the starting and ending subcarriers for the required bandwidth). As also discussed above, the determination of the actual number of subcarriers used is dependent on actual data rate to be transmitted by the DSL modem (upstream and downstream) as determined in step 90.

Figure 1:
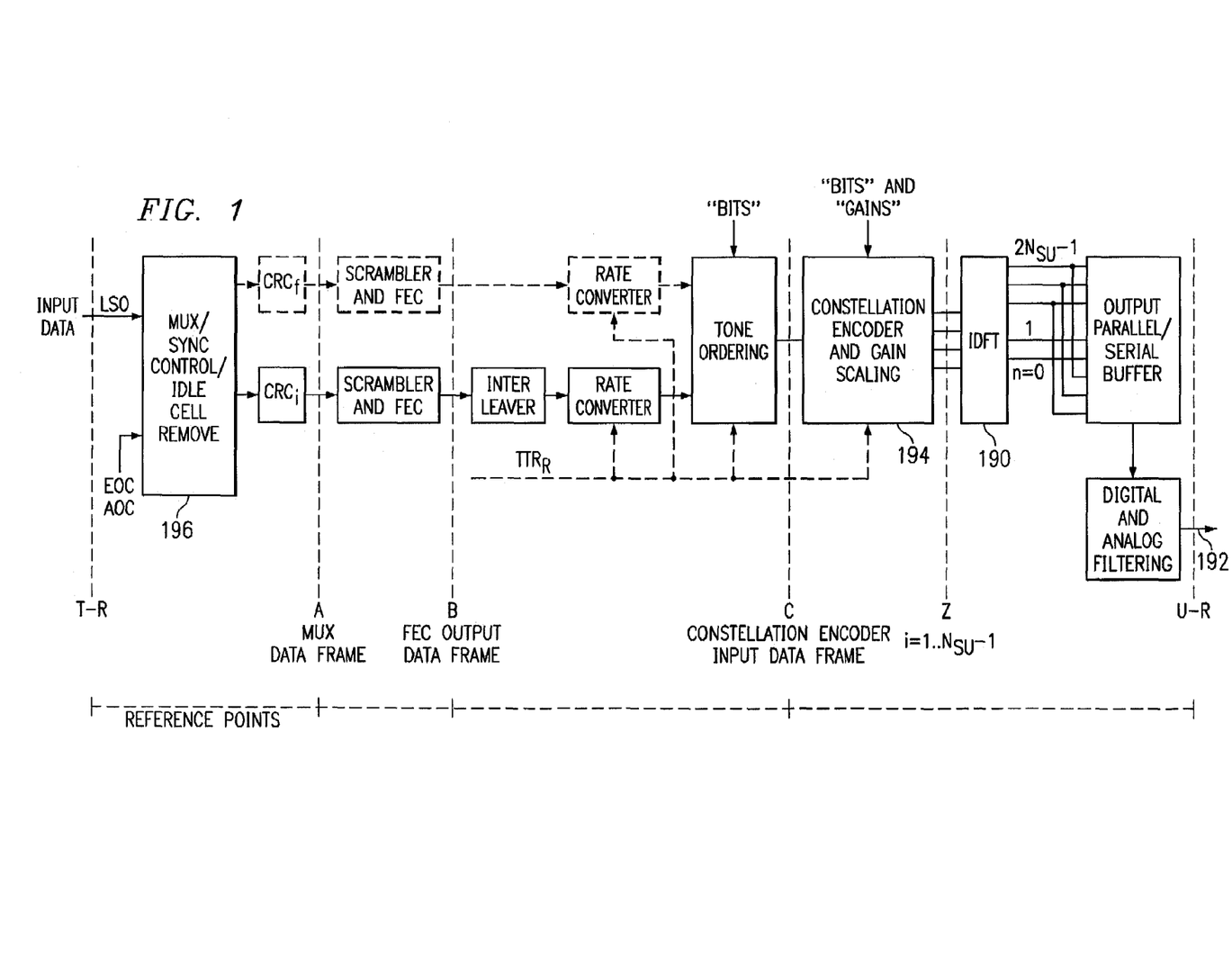
FIG. 1 is a functional block diagram of an ATU-R transmitter in accordance with an embodiment of the present invention.
Figure 2:
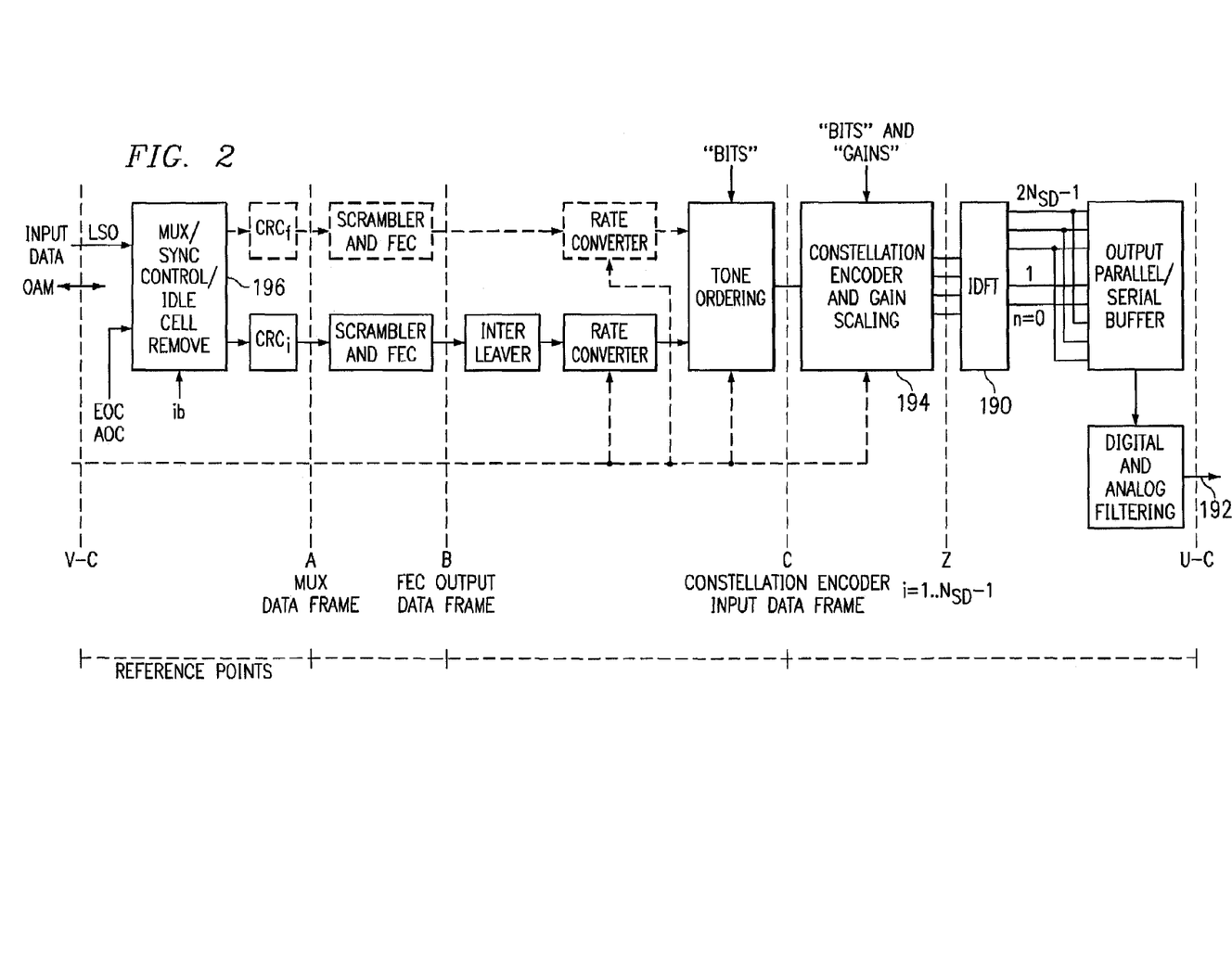
FIG. 2 is a functional block diagram of an ATU-C transmitter in accordance with an embodiment of the present invention.

Reference is now made to FIGS. 1 and 2 which illustrate functional block diagrams of ATU transmitters in accordance with embodiments of the present invention. The ATU-R transmitter is shown in FIG. 1 and the ATU-C transmitter is shown in FIG. 2. The ATU-R transmitter is similar to ATU-C transmitter but without need for and use of an Operation, Administration and Maintenance (OAM) path. The general configuration and operation of such DSL transmitters is well known to those skilled in the art. More detailed discussion of the transmitters is made only to the extent necessary to understand operation of the present invention. The operations of steps 90 and 92 as set forth in FIG. 4 may be performed by the Mux/Sync Control/Idle Cell Removal machine 196 within FIGS. 1 and 2.

Reference is now made in combination to FIGS. 1, 2 and 4. The generation of the NEXT minimized DSL signal in step 94 is realized through inverse Discrete Fourier Transform (IDFT) modulation (reference 190). The modulating transformation that defines the relationship between the real time domain samples $x_n$ (i.e., the DSL output signals) and the IDFT input $Z_i'$ (to be discussed below) is given by:

$$x_n = \sum_{i=0}^{2N-1} \exp\left(\frac{j\pi ni}{N}\right) Z_i' \quad (9)$$

wherein: n=0, ..., 2N−1;

N is a general symbol for the maximum number of the subcarriers supported by the modem (either $N_{SU}$ or $N_{SD}$); and i denotes the subcarrier whose real time domain samples $x_n$ are being calculated.

The result $x_n$ is the signal to be transmitted on the new DSL loop 192. When the steps 90 and 92 are performed by the ATM idle cell removal machine within the MUX/Sync/Idle Cell Remove block 196 in FIGS. 1 and 2 of the transmitter model, the output $x_n$ from the IDFT modulator 190 should generate less NEXT noise to other users in the cable bundle and be power reduced.

For ATU-R (residential or CPE location) and ATU-C (CO location) transmitters, $Z_i'$ is generated using different methods as discussed in more detail below.

For an ATU-R transmitter, assume that $N_{upstream}$ subcarriers ($k_1(i)$, $k_1(i)+1$, ..., $k_2(i)$, where $k_2(i)=k_1(i)+N_{upstream}-1$) are allocated for the transmission of an upstream signal for a given bit rate. The relationship between $k_1(i)$, $k_2(i)$, and $N_{SU}$ are: $k_1(i) \geq 1$ and $N_{SU} > k_2(i) > k_1(i)$. It should be noted, for the convenience of this discussion, that it is assumed that the $N_{upstream}$ subcarriers are continuous subcarriers in frequency domain, but this is not a necessity. The complex values from the constellation encoder and gain scaling (reference 194) for the i-th subcarrier is $Z_i$ (i.e., the input data to be transmitted, already packed into symbols). In order to generate the real output $x_n$ from the IDFT modulation as set forth above, $Z_i$ is first mapped to $Z_i'$ using:

$$Z_i' = \begin{cases} 0 & 0 \leq i < k_1(i) \\ Z_i & k_1(i) \leq i \leq k_2(i) \\ 0 & k_2(i)+1 \leq i \leq N_{SU} \end{cases} \quad (10)$$

The vector $Z_i'$ shall be augmented such that $Z_i'$ has the Hermitian symmetry as follows:

$$Z_i' = conj(Z'_{2N_{SU}-i}) \quad (11)$$

for $i=N_{SU}+1$ to $2N_{SU}-1$.

Equation (9) is then used by reference 190 to generate the real output $x_n$ from vector $Z_i'$.

For an ATU-C transmitter, assume $N_{downstream}$ subcarriers ($k_1(i)$, $k_1(i)+1$, ..., $k_2(i)$, wherein $k_2(i)=k_1(i)+N_{downstream}-1$) are allocated for the transmission of the downstream signal for a given rate. The relationship between $k_1(i)$, $k_2(i)$, $N_{SU}$ and $N_{SD}$ are: $k_1(i) \geq N_{SU}+1$; and $N_{SD} > k_2(i) > k_1(i)$.

As we mentioned earlier, the $N_{downstream}$ subcarriers allocated to the downstream need not necessarily be continuous. A non-overlapped spectrum is assumed in the DSL system operation for this discussion. In the overlapped mode, the generation of the DSL downstream signal is similar to the upstream. In order to generate real output $x_n$ from IDFT modulation (as discussed above), $Z_i$ is first mapped to $Z_i'$ using:

$$Z_i' = \begin{cases} 0 & 0 \leq i < k_1(i) \\ Z_1 & k_1(i) \leq i \leq k_2(i) \\ 0 & k_2(i)+1 \leq i \leq N_{SD} \end{cases} \quad (12)$$

The vector $Z_i'$ shall be augmented such that $Z_i'$ has Hermitian symmetry as follows:

$$Z_i' = conj(Z'_{2N_{SD}-i}) \quad (13)$$

for $i=N_{SD}+1$ to $2N_{SD}-1$.

Equation (9) is then used by reference 190 to generate the real output $x_n$ from vector $Z_i'$.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for optimizing digital subscriber line (DSL) communications performance over a cable bundle having a plurality of loops and including at least one active DSL loop, comprising the steps of:

determining, for a new DSL loop communication, a required bit rate of that new DSL loop communication, the determined required bit rate corresponding to a required band of plural adjacent subcarriers numbering less than a total available band of subcarriers on one of the plurality of loops;

calculating, for a plurality of subcarrier location positions of the required band of plural adjacent subcarriers for the new DSL loop communication within the total available band of subcarriers, a crosstalk noise effect of the new DSL loop communication with respect to the at least one active DSL loop;

choosing a location position for the required band of plural adjacent subcarriers to carry the new DSL loop communication within the total available band of subcarriers where the calculated crosstalk noise effect with respect to the at least one active DSL loop is minimized; and generating a multi-subcarrier DSL signal for the new DSL loop communication having the required band of plural adjacent subcarriers and positioned at the chosen location.

2. The method as in claim 1 wherein the at least one active DSL loop is at least two active DSL loops, and the step of choosing comprises the step of choosing a location position for the required band of plural adjacent subcarriers for the new DSL loop communication within the total available band of subcarriers where the calculated crosstalk noise effect with respect to the at least two active DSL loops is minimized.

3. The method as in claim 1 wherein a number of subcarriers needed for the required band of plural adjacent subcarriers varies with the plurality of location positions for the required band of plural adjacent subcarriers within the total available band of subcarriers.

4. The method as in claim 3 wherein the varying number of subcarriers, specified by a chosen location position for the required band of plural adjacent subcarriers having minimized crosstalk noise effect, effectuates a reduction in DSL modem power consumption.

5. The method as in claim 1 wherein the step of calculating further includes the step of sliding the required band of plural adjacent subcarriers across the total available band of subcarriers at the plurality of subcarrier location positions for which crosstalk noise effect is calculated.

6. The method as in claim 1 wherein the required band of plural adjacent subcarriers is a required number of upstream subcarriers and the total available band of subcarriers is a total available number of upstream subcarriers.

7. The method as in claim 1 wherein the required band of plural adjacent subcarriers is a required number of downstream subcarriers and the total available band of subcarriers is a total available number of downstream subcarriers.

8. The method as in claim 1 wherein the step of determining further comprises the step of removing unnecessary idle ATM cells, and the required bit rate for the new DSL loop communication is a bit rate needed for data communication over the new DSL loop without inclusion of unnecessary idle ATM cells.

9. The method as in claim 1 wherein the crosstalk noise effect is near-end crosstalk (NEXT) noise effect.

10. The method as in claim 1 wherein the calculated crosstalk noise effect is an estimation calculated effect.

11. The method as in claim 1 wherein the calculated crosstalk noise effect is an analytically calculated effect.

12. Apparatus for optimizing digital subscriber line (DSL) communications performance over a cable bundle having a plurality of loops and including at least one active DSL loop, comprising:

means for determining, for a new DSL loop communication, a required bit rate of that new DSL loop communication, the determined required bit rate corresponding to a required band of plural adjacent subcarriers numbering less than a total available band of subcarriers on one of the plurality of loops;

means for calculating, for a plurality of subcarrier location positions of the required band of plural adjacent subcarriers for the new DSL loop communication within the total available band of subcarriers, a crosstalk noise effect of the new DSL loop communication with respect to the at least one active DSL loop;

means for choosing a location position for the required band of plural adjacent subcarriers to carry the new DSL loop communication within the total available band of subcarriers where the calculated crosstalk noise effect with respect to the at least one active DSL loop is minimized; and means for generating a multi-subcarrier DSL signal for the new DSL loop communication having the required band of plural adjacent subcarriers and positioned at the chosen location.

13. The apparatus as in claim 12 wherein the at least one active DSL loop is at least two active DSL loops, and the means for choosing operates to choose a location position for the required band of plural adjacent subcarriers for the new DSL loop communication within the total available band of subcarriers where the calculated crosstalk noise effect with respect to the at least two active DSL loops is minimized.

14. The apparatus as in claim 13 wherein a number of subcarriers needed for the required band of plural adjacent subcarriers varies with the plurality of location positions for the required band of plural adjacent subcarriers within the total available band of subcarriers.

15. The apparatus as in claim 14 wherein the varying number of subcarriers, specified by a chosen location position for the required band of plural adjacent subcarriers having minimized crosstalk noise effect, effectuates a reduction in DSL modem power consumption.

16. The apparatus as in claim 12 wherein the means for calculating further includes means for sliding the required band of plural adjacent subcarriers across the total available band of subcarriers at the plurality of subcarrier location positions for which crosstalk noise effect is calculated.

17. The apparatus as in claim 12 wherein the required band of plural adjacent subcarriers is a required number of upstream subcarriers and the total available band of subcarriers is a total available number of upstream subcarriers.

18. The apparatus as in claim 12 wherein the required band of plural adjacent subcarriers is a required number of downstream subcarriers and the total available band of subcarriers is a total available number of downstream subcarriers.

19. The apparatus as in claim 12 wherein the means for determining further comprises means for removing unnecessary idle ATM cells, and the required bit rate for the new DSL loop communication is a bit rate needed for data communication over the new DSL loop without inclusion of the unnecessary idle ATM cells.

20. The apparatus as in claim 12 wherein the crosstalk noise effect is near-end crosstalk (NEXT) noise effect.

21. The apparatus as in claim 12 wherein the calculated crosstalk noise effect is an estimation calculated effect.

22. The apparatus as in claim 12 wherein the calculated crosstalk noise effect is an analytically calculated effect.

23. A digital subscriber line (DSL) transmitter connected to a certain loop in a cable bundle having a plurality of other loops and including active DSL loop communications on the other loops, comprising:

an ATM idle cell removal machine that is operable to determine for a new DSL loop communication on the certain loop a required bit rate that corresponds to a required band of adjacent DMT subcarriers less than a total available number of DMT subcarriers on that certain loop;

a noise estimation algorithm that is operable to calculate, at each one of a plurality of possible subcarrier positions of the band of adjacent DMT subcarriers within the total available number of DMT subcarriers, a crosstalk noise effect of the new DSL loop communication with respect to the active DSL loop communications on the other loops; and a noise minimization algorithm that is operable to choose one of the possible subcarrier positions as a location of the required band of adjacent DMT subcarriers within the total available number of DMT subcarriers, wherein the calculated crosstalk noise effect with respect to the active DSL loop communications on the other loops at the chosen one of the possible positions is minimized; and a DSL signal generator for generating an active DSL loop communication for that new DSL loop communication having the required band of adjacent DMT subcarriers and positioned at the chosen location.

24. The transmitter as in claim 23 wherein the required band of adjacent DMT subcarriers corresponds to a certain number of DMT subcarriers that varies with the plurality of possible subcarrier positions for the required band of adjacent DMT subcarriers within the total available number of DMT subcarriers.

25. The transmitter as in claim 24 wherein the varying certain number of subcarriers, specified by a chosen possible subcarrier position for the required band of adjacent DMT subcarriers having minimized crosstalk noise effect, effectuates a reduction in transmitter power consumption.

26. The transmitter as in claim 23 wherein the noise minimization algorithm further operates to slide the required band of adjacent DMT subcarriers across the total available number of DMT subcarriers at the plurality of possible subcarrier positions for which crosstalk noise effect is calculated.

27. The transmitter as in claim 23 wherein the required band of adjacent DMT subcarriers is a required number of upstream subcarriers and the total available number of DMT subcarriers is a total number of available upstream subcarriers.

28. The transmitter as in claim 23 wherein the required band of adjacent DMT subcarriers is a required number of downstream subcarriers and the total available number of DMT subcarriers is a total number of available downstream subcarriers.

29. The transmitter as in claim 23 wherein the idle cell removal machine further operates to remove unnecessary idle ATM cells, and the required bit rate for the new DSL loop communication is a bit rate needed for data communication over the certain loop without inclusion of unnecessary idle ATM cells.

30. The apparatus as in claim 23 wherein the crosstalk noise effect is near-end crosstalk (NEXT) noise effect.

31. The apparatus as in claim 23 wherein the calculated crosstalk noise effect is an estimation calculated effect.

32. The apparatus as in claim 23 wherein the calculated crosstalk noise effect is an analytically calculated effect.

* * * * *

UNITED STATES PATENT AND TRADEMARK OFFICE
CERTIFICATE OF CORRECTION

PATENT NO. : 7,126,984 B2
APPLICATION NO. : 10/029190
DATED : October 24, 2006
INVENTOR(S) : Xianbin Wang It is certified that error appears in the above-identified patent and that said Letters Patent is hereby corrected as shown below:

Column 5, line 34    Replace "purposes) Following"
                     With --purposes).  Following--

Column 12, Equation 12    Replace $$Z_i' = \begin{cases} 0 & 0 \leq i < k_1(i) \\ Z_i & k_1(i) \leq i \leq k_2(i) \\ 0 & k_2(i)+1 \leq i \leq N_{SD} \end{cases}$$

With $$Z_i' = \begin{cases} 0 & 0 \leq i < k_1(i) \\ Z_i & k_1(i) \leq i \leq k_2(i) \\ 0 & k_2(i)+1 \leq i \leq N_{SD} \end{cases}$$

Column 12, Equation 13    Replace

$$Z_i' = conj(Z'_{2N_{SD}-i})$$

With $$Z_i' = conj(Z'_{(2N_{SD}-i)})$$

Signed and Sealed this

Twentieth Day of March, 2007

JON W. DUDAS
*Director of the United States Patent and Trademark Office*